(12) United States Patent
Shinnaka et al.

(10) Patent No.: US 10,294,690 B2
(45) Date of Patent: May 21, 2019

(54) STORAGE FACILITY FOR OBJECT OF PAYING OF RESPECTS

(71) Applicant: Daifuku Co., Ltd., Osaka-shi (JP)

(72) Inventors: Hidenobu Shinnaka, Tokyo (JP); Haruhito Furuya, Tokyo (JP); Wataru Kiyokawa, Tokyo (JP); Hideki Sato, Tokyo (JP); Yukinori Kameda, Tokyo (JP); Kazuya Arima, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/926,059

(22) Filed: Mar. 20, 2018

(65) Prior Publication Data

US 2018/0274260 A1    Sep. 27, 2018

(30) Foreign Application Priority Data

Mar. 22, 2017    (JP) .................. 2017-055642

(51) Int. Cl.
*E04H 13/00*    (2006.01)
*B65G 1/06*    (2006.01)
(Continued)

(52) U.S. Cl.
CPC ............. *E04H 13/006* (2013.01); *B65G 1/06* (2013.01); *B65G 1/0421* (2013.01);
(Continued)

(58) Field of Classification Search
CPC ...... E04H 13/006; B65G 1/137; B65G 13/04; B65G 1/06; B65G 1/0435; E06B 9/24; E06B 2009/2464

See application file for complete search history.

(56) References Cited

U.S. PATENT DOCUMENTS 3,160,263 A * 12/1964 Lewis .................. B65G 19/225
                                                                198/719
4,201,347 A * 5/1980 Elkin ....................... B02C 7/08
                                                                241/100
(Continued)

FOREIGN PATENT DOCUMENTS

JP    2002235459 A    8/2002

*Primary Examiner* — Joshua K Ihezie
(74) *Attorney, Agent, or Firm* — The Webb Law Firm

(57) ABSTRACT

A plurality of storage sections include one or more reference storage sections each of which is defined to be a storage section that has an occupiable area at least a portion of which extends over a same positional range along the first direction as a portion of an occupiable area in the support position. A transport device includes a projecting and retracting mechanism configured to project and retract along the first direction a holding member configured to hold an object of paying of respects, and is configured to move the holding member toward a partition wall side along the first direction when moving an object of paying of respects to a reference storage section or to the support position by means of the projecting and retracting mechanism. The amount of projection of the holding member toward the partition wall side when moving an object of paying of respects to the support position is set to be greater than the amount of projection of the holding member toward the partition wall side when moving an object of paying of respects to a reference storage section.

5 Claims, 6 Drawing Sheets

(51) Int. Cl.
*B65G 1/04* (2006.01)
*E06B 9/24* (2006.01)

(52) U.S. Cl.
CPC .............. *B65G 1/0435* (2013.01); *E06B 9/24* (2013.01); *E06B 2009/2464* (2013.01)

(56) References Cited

U.S. PATENT DOCUMENTS

| | | | | |
|---|---|---|---|---|
| 4,688,359 A * | 8/1987 | See | ................... | A61G 17/08 52/104 |
| 4,739,595 A * | 4/1988 | Yamagata | ............... | E04H 13/00 312/33 |
| 4,862,655 A * | 9/1989 | LePage | ................. | E04H 13/005 52/136 |
| 5,195,812 A * | 3/1993 | Eickhof | ............. | A47B 47/0091 312/257.1 |
| 5,456,562 A * | 10/1995 | Schlecker | ................ | E04H 6/186 414/254 |
| 5,477,594 A * | 12/1995 | LePage | ................. | E04H 13/006 211/194 |
| 7,128,521 B2 * | 10/2006 | Hansl | ................... | B65G 1/0435 414/807 |
| 7,926,228 B1 * | 4/2011 | Snow | ................... | E04H 13/008 27/35 |
| 2003/0156928 A1 * | 8/2003 | Sackett | ............. | H01L 21/67769 414/217 |
| 2008/0116772 A1 * | 5/2008 | Champagne | ............ | A47F 3/005 312/117 |
| 2010/0139060 A1 * | 6/2010 | Leeder | ................... | E04H 13/008 27/1 |
| 2011/0044792 A1 * | 2/2011 | Talley | ................... | B65G 1/0407 414/807 |
| 2011/0082588 A1 * | 4/2011 | McDowell, Jr. | ......... | E04H 6/225 700/275 |
| 2013/0019544 A1 * | 1/2013 | Ng | ........................... | E04H 13/00 52/133 |
| 2013/0086779 A1 * | 4/2013 | Florea | ..................... | A61G 17/08 27/1 |
| 2013/0199111 A1 * | 8/2013 | Eickhof | ................ | E04H 13/006 52/134 |
| 2013/0332563 A1 * | 12/2013 | Yuen | ...................... | G06O 99/00 709/217 |
| 2014/0182096 A1 * | 7/2014 | Jairala, Jr. | ............... | A61G 17/08 27/1 |
| 2014/0366983 A1 * | 12/2014 | Takahara | ................ | F17C 13/02 141/197 |
| 2015/0052830 A1 * | 2/2015 | School | ................... | E04H 13/006 52/134 |
| 2015/0252583 A1 * | 9/2015 | Dvorak | ................... | E04H 13/006 52/103 |
| 2017/0211291 A1 * | 7/2017 | Eickhof | ................ | A61G 17/08 |
| 2018/0134488 A1 * | 5/2018 | Grosse | ................. | B65G 1/0435 |
| 2018/0209164 A1 * | 7/2018 | Rossi | .................... | E04H 13/008 |

\* cited by examiner

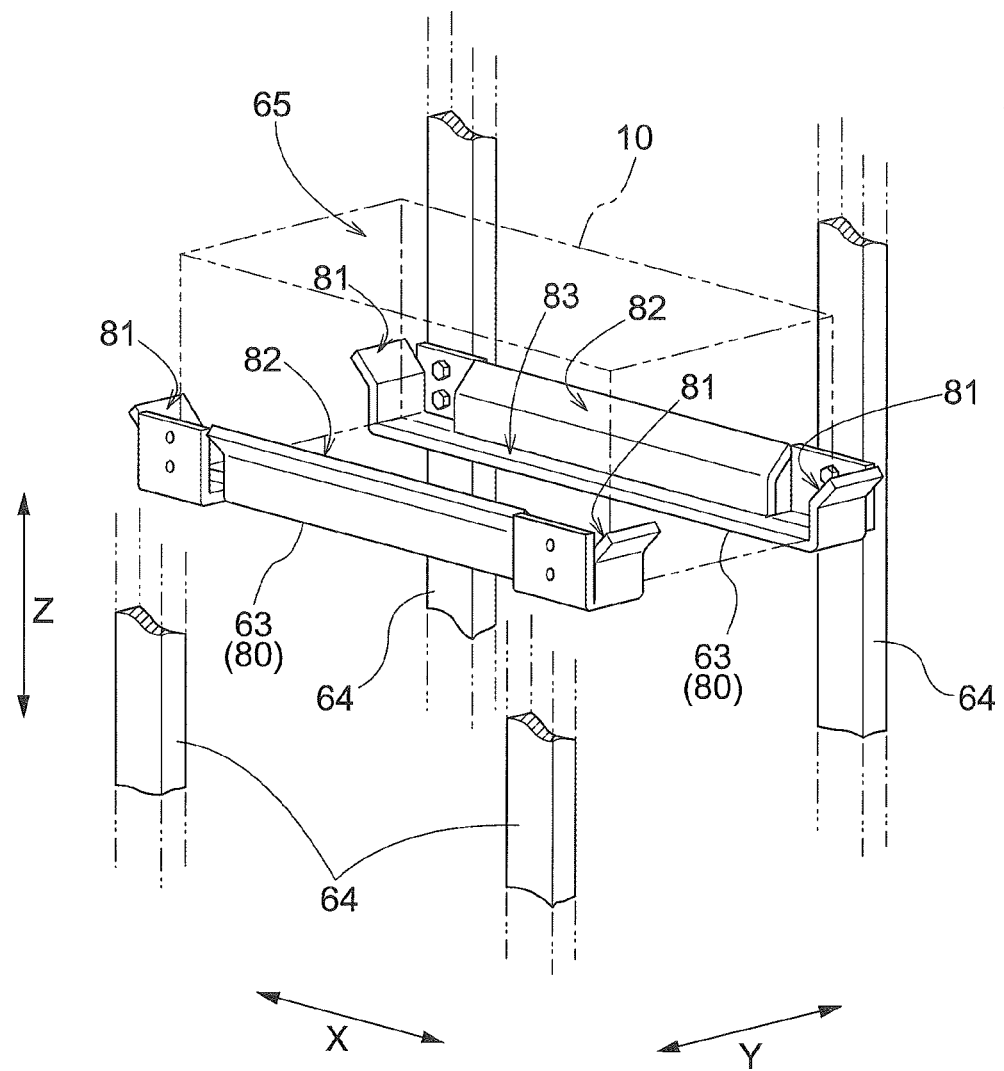

STORAGE FACILITY FOR OBJECT OF PAYING OF RESPECTS

CROSS-REFERENCE TO RELATED APPLICATION

This application claims priority to Japanese Patent Application No. 2017-055642 filed Mar. 22, 2017, the disclosure of which is hereby incorporated in its entirety by reference.

FIELD OF THE INVENTION

The present invention relates to a storage facility for objects of paying of respects comprising a plurality of storage sections each configured to store an object of paying of respects, a respects-paying area which includes an area for a person, visiting to pay respects, to pay respects, and a transport device configured to transport an object of paying of respects between any of the plurality of storage sections and a support position provided in the respects-paying area.

BACKGROUND ART

An example of a storage facility for object of paying of respects is described in JP Publication of Application No. 2002-235459 (Patent Document 1). A storage facility for object of paying of respects described in Patent Document 1 is a columbarium system in which containers (2), each holding a funerary or cinerary urn (1), are the objects of paying of respects. And the facility includes a storage device (A) in which a plurality of containers (2) are stored, a respects-paying area (B) which includes an area in which a person visiting to pay respects pays respects, and a transport device (C) which transports a container (2) between the storage device (A) and the respects-paying area (B). And when a person visits to pay respects, a desired container (2) is taken out from the storage device (A) by the transport device (C) and is transported to the respects-paying area (B) in which the person visiting to pay respects awaits. Note that, in addition to the stacker crane (11) which transports a container (2) taken out from the storage device (A) to a position (E) that is at the same height as the respects-paying area (B), the transport device (C) also includes a conveyor (12) which moves the container (2) horizontally from the position (E) toward the person visiting to pay respects. By providing this conveyor device (12), it is possible to bring the support position (D) of the container (2) in the area of paying of respects (B) closer to the person visiting to pay respects.

SUMMARY OF THE INVENTION

However, with the storage facility for object of paying of respects described in Patent Document 1, it is necessary to provide a conveyor exclusively for horizontally moving an object of paying of respects toward the person visiting to pay respects, in addition to the stacker crane which takes out an object of paying of respects from a storage section. Thus, the structure of the transport device tends to be more complex and the number of component parts of the transport device tends to be greater compared with a case in which the transport device for transporting an object of paying of respects between a storage section and the support position does not include such any conveyor. And a complex structure and an increased number of parts of the transport device may lead to an increase in the production cost of the facility and to an increased frequency of problems such as malfunctions during the operation of the facility.

A storage facility for objects of paying of respects is desired in which a transport device which transports an object of paying of respects between a storage section and a support position has a relatively simple structure while shortening a distance between the support position and a person visiting to pay respects.

A storage facility for objects of paying of respects in accordance with the present disclosure comprises: a plurality of storage sections each configured to store an object of paying of respects; a respects-paying area which includes an area for a person, visiting to pay respects, to pay respects; and a transport device configured to transport an object of paying of respects between any of the plurality of storage sections and a support position provided in the respects-paying area, wherein a partition wall extending vertically is provided in the respects-paying area, wherein the partition wall is so located to partition off the support position from the person visiting to pay respects, at a partition position along a first direction parallel to a horizontal plane, wherein a window for allowing the person visiting to pay respects to view an object of paying of respects is formed in an area, of the partition wall, toward which the object of paying of respects faces along the first direction when supported in the support position, wherein the plurality of storage sections include one or more reference storage sections each of which is defined to be a storage section that has an occupiable area at least a portion of which extends over a same positional range along the first direction as a portion of an occupiable area in the support position, wherein the transport device includes a projecting and retracting mechanism configured to project and retract along the first direction a holding member configured to hold an object of paying of respects, wherein the transport device is configured to move the holding member toward a partition wall side along the first direction when moving an object of paying of respects to a reference storage section or to the support position by means of the projecting and retracting mechanism, and wherein an amount of projection of the holding member toward the partition wall side when moving an object of paying of respects to the support position is set to be greater than an amount of projection of the holding member toward the partition wall side when moving an object of paying of respects to a reference storage section.

With the arrangement described above, an object of paying of respects can be moved to a support position by making use of the projecting and retracting mechanism provided in a transport device to transfer an object of paying of respects between the transport device and a storage section. Thus, the structure of the transport device can be made simpler compared with the case in which a mechanism for moving an object of paying of respects to a support position is provided to the transport device in addition to a projecting and retracting mechanism.

In addition, with the arrangement described above, regarding the amount of projecting and retracting movement of the holding member (provided to the transport device for holding an object of paying of respects) by the projecting and retracting mechanism, the amount of projection of the holding member toward the partition wall side when moving an object of paying of respects to the support position is set to be greater than an amount of projection of the holding member toward the partition wall side when moving an object of paying of respects to a reference storage section. Therefore, the support position can be brought, or set to be, closer to the window (i.e., can be brought, or set to be, closer to the person visiting to pay respects who would be viewing the object of paying of respects through the window) compared with the case where these amounts of projection are set to be identical to each other.

In addition, with the arrangement described above, the support position is located or set such that at least a portion of an occupiable area (of each of one or more reference storage sections) extends over a same positional range along the first direction as a portion of an occupiable area in the support position. Thus, there is an additional advantage that the dimension, along the first direction, of the entire facility of can be made smaller than otherwise.

Therefore, with the arrangement described above, a storage facility for objects of paying of respects can be provided in which the transport device configured to transport an object of paying of respects between a storage section and a support position has a relatively simple structure while shortening a distance between the support position and a person visiting to pay respects.

BRIEF DESCRIPTION OF THE DRAWINGS

FIG. 7 is a perspective view of a storage section in accordance with another embodiment.

DETAILED DESCRIPTION OF EMBODIMENTS

Figure 1:
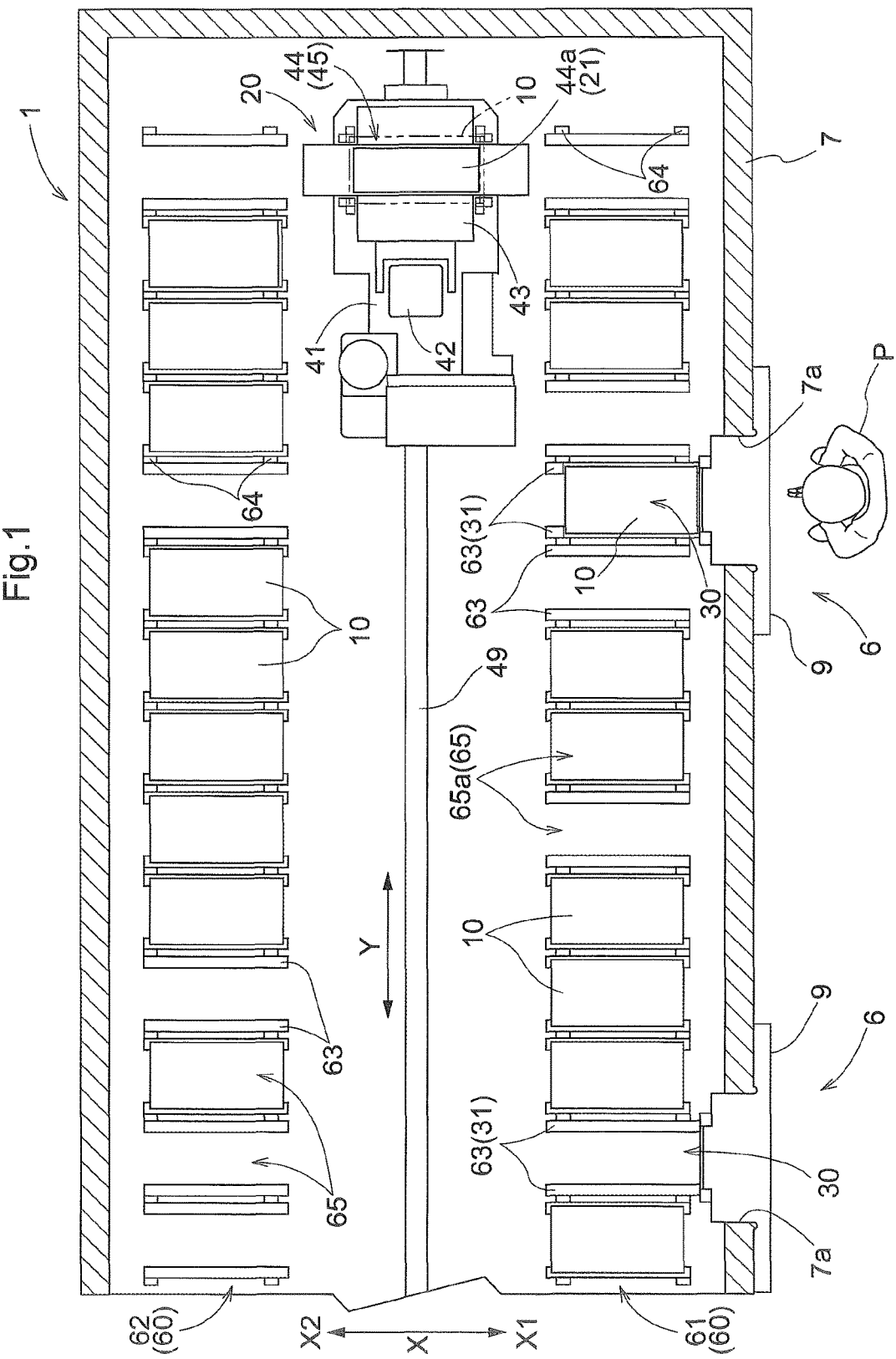
FIG. 1 is a plan view of a storage facility for objects of paying of respects.
Figure 2:
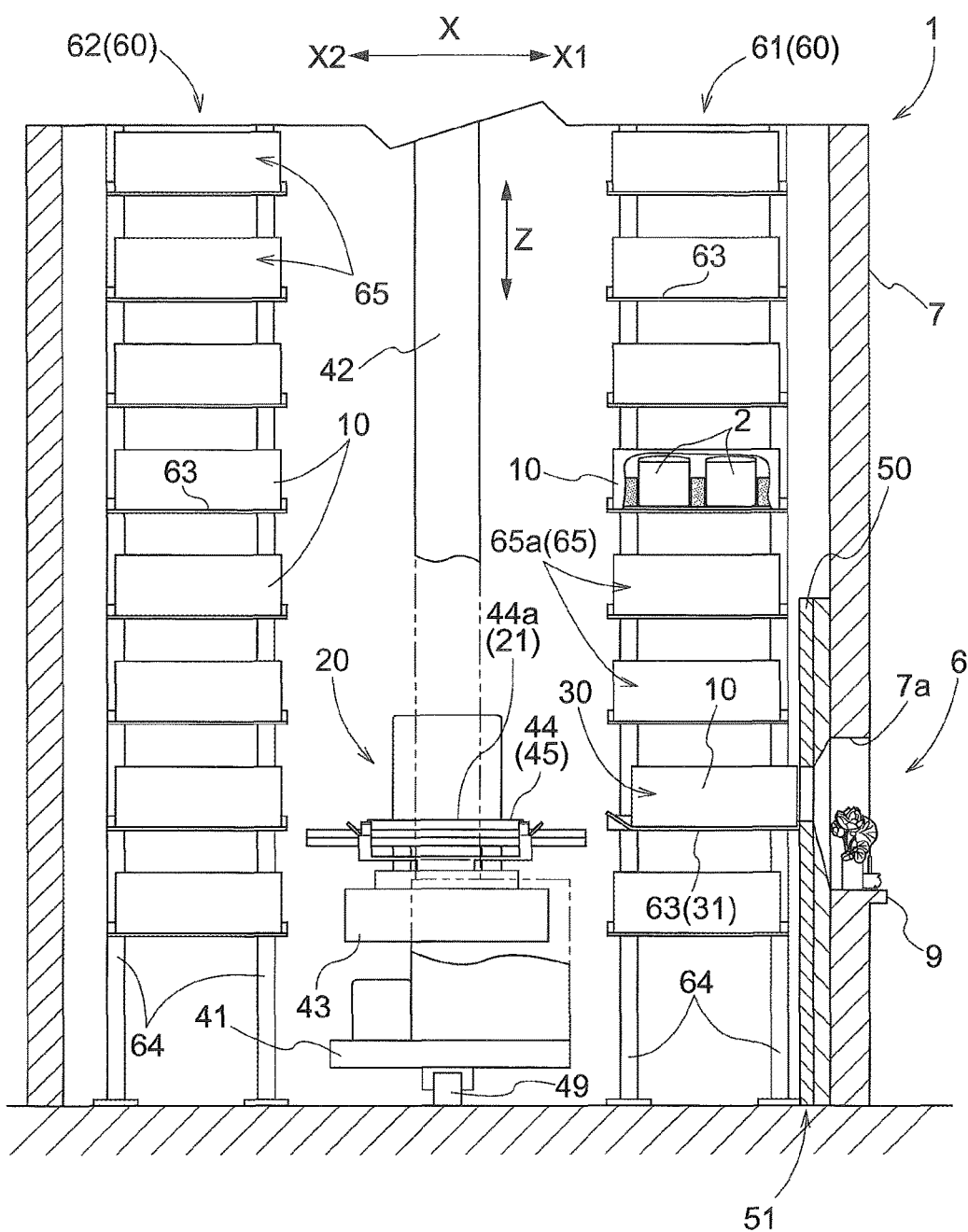
FIG. 2 is a side view of the storage facility for objects of paying of respects.

Embodiments of a storage facility for object of paying of respects are described next with reference to the drawings. As shown in FIGS. 1 and 2, a storage facility for object of paying of respects (referred to hereinafter simply as the storage facility 1) is a facility which includes a plurality of storage sections 65 each for storing an "object 10 of paying of respects", respects-paying areas 6 each of which includes an area for a person P (visiting to pay respects) to pay respects, and a transport device 20 which transports an object 10 of paying of respects between a storage section 65 and a support position 30 provided in the corresponding respects-paying area 6. Note that, as can be understood from the description below, each respects-paying area 6 also includes an area for an object of paying of respects which includes an area surrounding an object of paying of respects when such object is in a support position described below, thus, each respects-paying area 6 includes an area intended for a person visiting to pay respects to be oriented toward when paying respects. As such, each respects-paying area 6 includes a respects-paying portion which includes a support portion described below as well as a portion that can provide an area for a person (visiting to pay respects) to pay respects, among other things that may be described to be provided in a respects-paying area. That is, the storage facility 1 is a facility which people visit to pay respects. The storage facility 1 includes a controller 5 (see FIG. 6) configured to control operation of the transport device 20. And when commanded by the controller 5, the transport device 20 transports an object 10 of paying of respects (that the person P visiting to pay respects intends to see) from a storage section 65 to a support position 30 and also transports the object 10 of paying of respects from a support position 30 to a storage section 65 after the person finishes the paying of respects.

As shown in FIG. 2 in which a portion of a side surface of one object 10 of paying of respects is removed to show its inside, an object 10 of paying of respects is a container (a container for religious purposes) for holding, or configured to hold, a funerary urn containing a deceased's cremated remains, and is generally formed in a box shape (or in a shape of a rectangular parallelepiped in the present example) which forms a space for accommodating one or more objects 2 held within the container (housed objects 2 for short). A funerary urn, as a housed object 2, may contain cremated remains such as cremated pieces of bone of a deceased person or pet (referred to hereinafter simply as "cremated remains"). The housed object 2 can also be a container other than a funerary urn, such as a bag containing cremated remains. In addition, a housed object 2 (or object or material contained in a housed object 2) may be something other than cremated pieces of bone and may be ashes of the deceased person or pet (referred to hereinafter simply as "ashes"), a manufactured object containing cremated pieces of bone and/or ashes (for example, a mortuary tablet, a religious statue such as that of Buddha, etc.), a manufactured object containing no cremated pieces of bone or ashes (for example, a mortuary tablet, a religious statue, such as, that of Buddha, Christ or Mary, etc.), or an article which is left by, or reminds of, the deceased or pet, etc., or any combination thereof.

Figure 4:
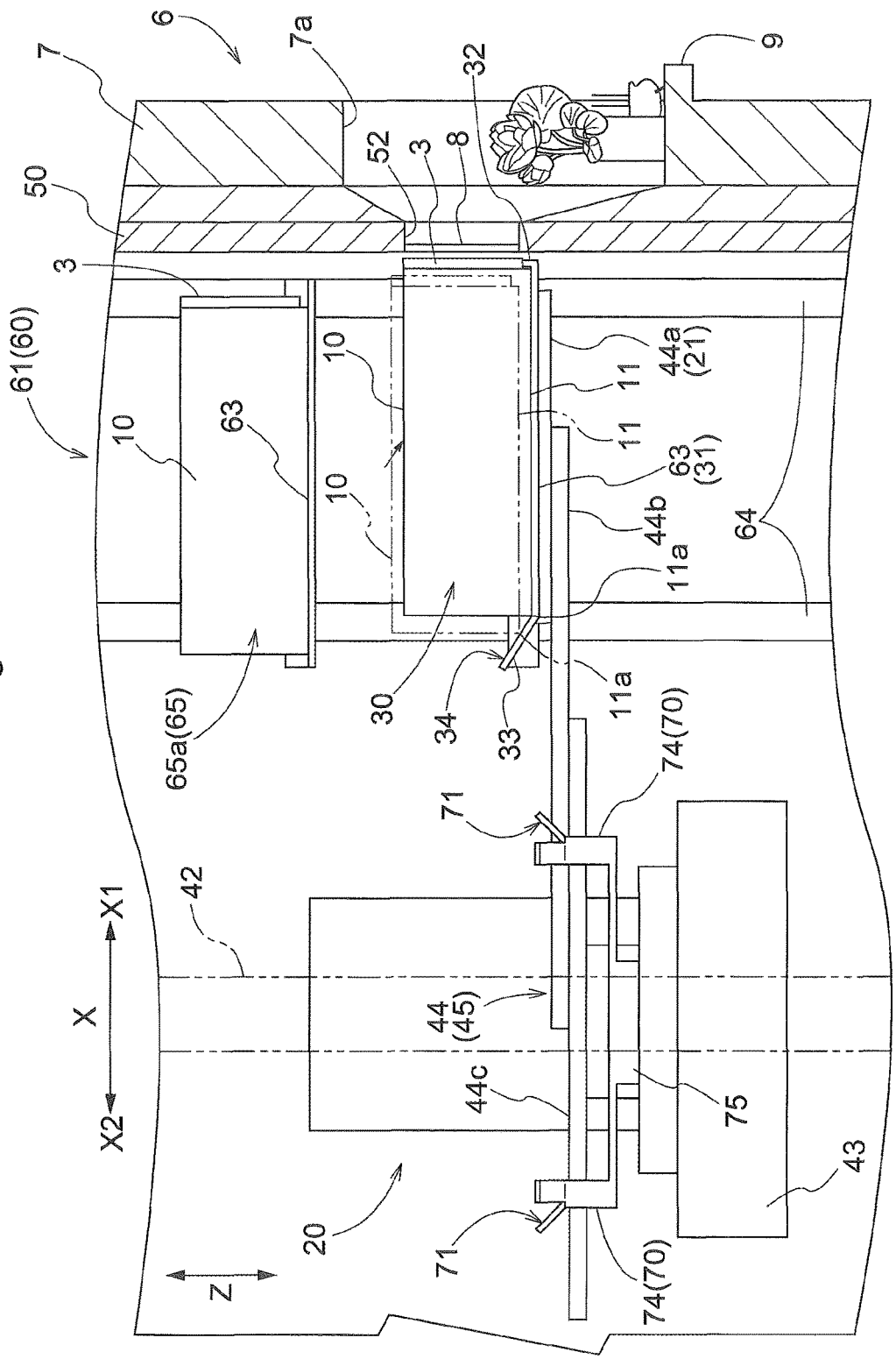
FIG. 4 is an explanatory drawing which shows transporting of an object of paying of respects to the support position.

As shown in FIG. 4, each object 10 of paying of respects has a plate-shaped member 3 (generally flat and thin (thickness is less than its length and width)) with information related to the housed object 2 shown on it. Note that simplified forms of the objects 10 of paying of respects are shown in drawings other than FIG. 4, without showing the plate-shaped members 3. The plate-shaped member 3 is attached to a side surface (outer surface of a side wall) of a main body portion (generally box shaped portion) which forms the accommodating space for the housed object 2 in an object 10 of paying of respects. The main body portion of an object 10 of paying of respects may be formed, for example, with metallic materials (stainless steel etc.) whereas the plate-shaped member 3 may be a slab of stone, or may be made with, for example, stone material. The information related to the housed object 2 is expressed by a set of characters, one or more designed figures, one or more symbols, or a combination thereof. And the information is carved, printed, etc., so that it is visible on a surface of the plate-shaped member 3 (i.e., on an outward surface when the plate-shaped member 3 is attached to the main body portion of an object 10 of paying of respects). Examples of the information related to the housed object 2 include the deceased's family name, the deceased's family crest or symbol, the deceased's favorite words or saying.

Figure 3:
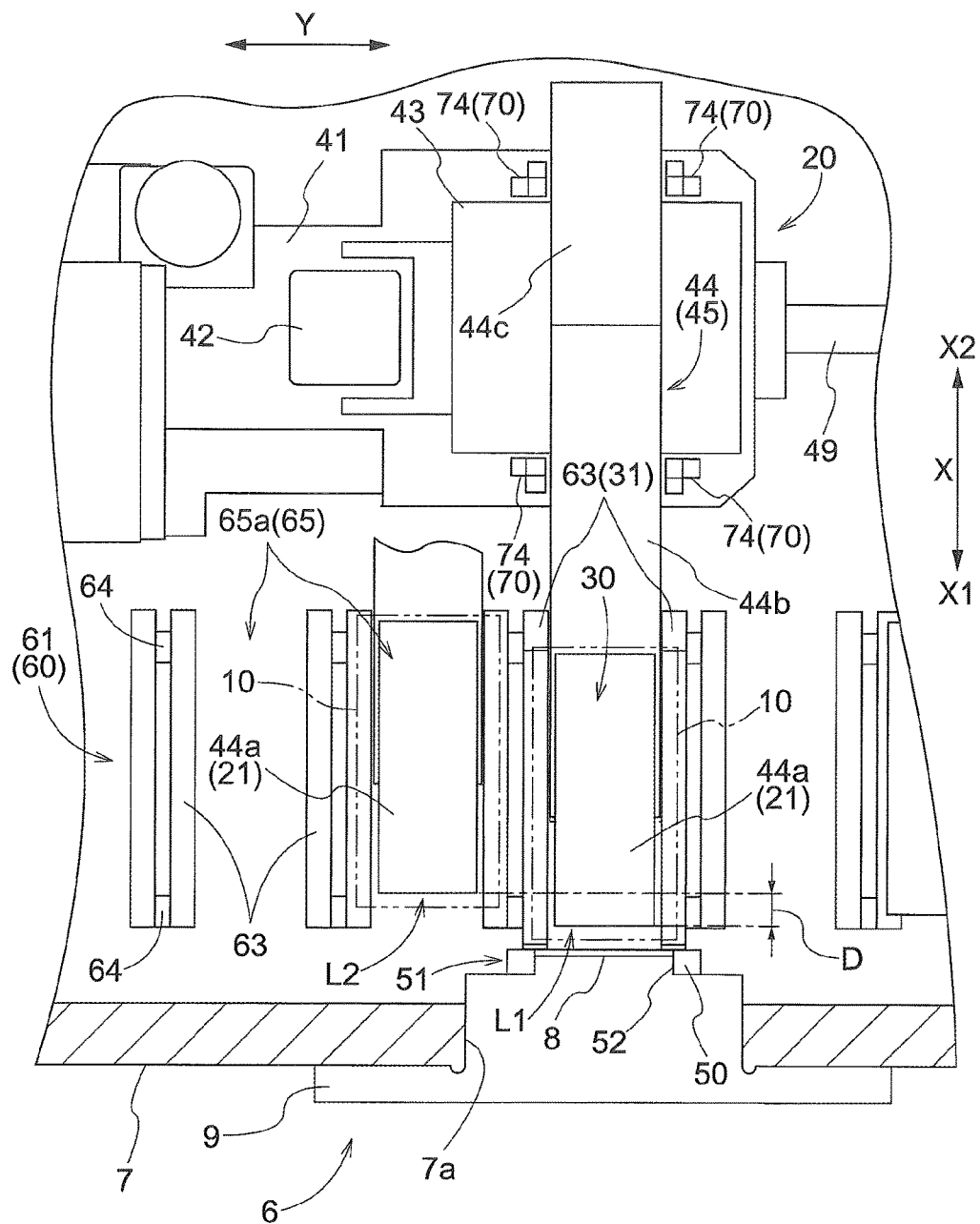
FIG. 3 is an explanatory drawing which shows transporting of an object of paying of respects to a reference storage section and to a support position.

As shown in FIG. 2 and FIG. 4, a partition wall 50 extending vertically (i.e., extending generally along a vertical direction Z) is provided in the corresponding respects-paying area 6. The partition wall 50 is so located to partition off a support position 30 from a person P visiting to pay respects (i.e., to divide an neighboring area into an area which a person P visiting to pay respects is in and an area in which a support position 30 exists), with the division being located in a partition position 51 (see FIGS. 2 and 3) along the first direction X extending along, i.e., parallel to, a horizontal plane. And a window 52 (an opening for the purposes of paying respects) for allowing a person P visiting to pay respects to view an object 10 of paying of respects is formed in an area or a portion (of the partition wall 50) toward which an object 10 of paying of respects faces along the first direction X when supported in the support position 30. Therefore, when a person P visiting to pay respects, they can view the object 10 of paying of respects supported in the support position 30 through the window 52. The window 52 is formed to correspond in shape and dimensions to those of the plate-shaped member 3, and is rectangular in shape in the present embodiment. The window 52 is covered by a windowpane 8 (generally-plate-shaped material) as shown in FIGS. 3 and 4. A clear glass plate, or a glass with variable opacity which can be changed between a transparent state and a non-transparent state by changing the supply of electric energy may be used as the windowpane 8.

As shown in FIG. 4, an object 10 of paying of respects is supported in a support position 30 such that the plate-shaped member 3 is oriented toward a first side X1 where the first side X1 is defined as the side, along the first direction X, on which the window 52 is located with respect to the support position 30 (in other words, the side, along the first direction X, on which the window 52 is located with respect to the support portion 31 described below) while the side opposite to the first side X1 is defined as a second side X2. Therefore, the person P visiting to pay respects can view the plate-shaped member 3 of the object 10 of paying of respects supported in a support position 30, through the window 52.

As shown in FIGS. 1 and 2, each storage rack 60 is formed with a plurality of storage sections 65 located in the same position along the first direction X. The plurality of storage sections 65 which form each storage rack 60 are arranged in a plurality of horizontal rows with one horizontal row located above another along a vertical direction Z and in a plurality of vertical rows with one vertical row located next to another along a second direction Y (which is a direction perpendicular to the first direction X in a horizontal plane). In other words, each storage rack 60 is so oriented that a rack depth or thickness direction is parallel to the first direction X whereas a rack lateral direction is parallel to the second direction Y. Each storage rack 60 includes a plurality of support columns 64 extending along the vertical direction Z, and a plurality of support arms 63 (each of which includes a generally-plate-shaped member) extending along the first direction X. Each support arm 63 is fixed to each of a pair of support columns 64 that are adjacent each other along the first direction X. The storage sections 65 are divided into individual sections by the support columns 64 along the second direction Y and by the support arms 63 along the vertical direction Z. As shown in FIG. 1, each object 10 of paying of respects is stored in a storage section 65 with the object 10 being supported by a pair of support arms 63 that are spaced apart from each other along the second direction Y. Each storage section 65 is configured to store one object 10 of paying of respects. A pair of storage racks 60 are provided such that that they face each other along the first direction X. In the following description, one of the storage racks 60 of the pair that is located on the first side X1 will be referred to as the first storage rack 61 whereas the other of the storage racks 60 of the pair that is on the second side X2 will be referred to as the second storage rack 61.

The storage facility 1 includes walls 7 that surround a side perimeter of the storage racks 60 of the pair (perimeter as seen along the vertical direction). And the transport device 20 transports objects 10 of paying of respects, one at a time, within the area surrounded by the walls 7. As shown in FIGS. 3 and 4, a wall 7 (a wall that divides an neighboring area into an area which a person P visiting to pay respects is in and an area in which the support position 30 is located) at least a part of which is located in the respects-paying area 6 is located on the first side X1 with respect to the partition wall 50. And an opening 7a is formed in a portion or area of the wall 7 which the window 52 would have otherwise faced along the first direction X. The opening 7a is so formed that the entire window 52 is included, or can be seen through the opening 7a, as seen along the first direction X so that a person P visiting to pay respects can view an object 10 of paying of respects supported in the support position 30 through the opening 7a and the window 52. An altar 9 on which incense sticks, an offering, etc., may be placed is formed in a portion of the wall 7 that defines the lower edge of the opening 7a. In addition, a gravestone pattern (for example, a granite pattern or design that imitates a gravestone surface) is applied to, attached to, or otherwise placed on, a surface of the wall 7 (the surface that faces the first side X1) around the opening 7a.

As shown in FIGS. 1 and 2, each support position 30 is provided, or defined, in place of one or more storage sections 65 in the first storage rack 61. More specifically, in the first storage rack 61, a plurality of unit spaces each for forming one storage section 65 (with each unit space being defined by adjacent support arms 63 and adjacent support columns 64) are arranged in a plurality of horizontal rows with one horizontal row located above another along the vertical direction Z and in a plurality of vertical rows with one vertical row located next to another along the second direction Y. Some of these unit spaces are used instead to define the support positions 30. And, as shown in FIGS. 1 and 3, in each support position 30, an object 10 of paying of respects can be supported from below by a pair of support arms 63 that are located to be spaced apart, and adjacent, along the second direction Y, from each other. That is, each support portion 31 which is configured to support an object 10 of paying of respects in the support position 30 is formed by a pair of support arms 63 provided at the support position 30. Thus, a support portion 31 on which an object 10 of paying of respects transported by the transport device 20 is placed is provided for and at each support position 30.

Since the support positions 30 are provided in place of some storage sections 65 in the first storage rack 61 as described above, each support position 30 is located such that there is an occupiable area in the support position 30 (i.e., a three-dimensional area in which an object 10 of paying of respects can be placed when placed in the support position 30) a portion of which extends over the same positional range along the first direction X as at least a portion of an occupiable area (three-dimensional area in a given storage section 65 in which an object 10 of paying of respects can be placed) of each of the storage sections 65 of the first storage rack 61. More specifically, an object 10 of paying of respects (supported in a support position 30) excluding an end portion thereof on the first side X1 would be located in, occupy, or extends over, the same positional range along the first direction X as an object 10 of paying of respects (stored in a storage section 65) excluding an end portion thereof on the second side X2. Here, with a reference storage section 65 being defined to be a storage section 65 which has an occupiable area at least a portion of which extends over the same positional range along the first direction X as a portion of an occupiable area in a support position 30, each of the plurality of storage sections 65 of the first storage rack 61 is a reference storage section 65a whereas each of the plurality of storage sections 65 of the second storage rack 62 is a non-reference storage section (storage section 65 that is not a reference storage section 65*a*). Thus, the plurality of storage sections 65 provided to the storage facility 1 include a plurality of reference storage sections 65*a* and a plurality of non-reference storage sections.

As shown in FIGS. 1 and 2, the transport device 20 is a stacker crane. More specifically, the transport device 20 includes a travel member 41 configured to travel while being guided by a rail 49 installed on a floor surface, a mast 42 arranged vertically on the travel member 41, a vertically movable member 43 which can be raised and lowered (or movable along the vertical direction Z) while being guided by the mast 42, and a transfer device 45 supported by the vertically movable member 43. In addition, as shown in FIG. 6, the transport device 20 includes a travel motor 90, a vertical movement motor 91, a projecting and retracting motor 92, and a positioning motor 93, each of which is an electric motor controlled by the controller 5. The controller 5 controls the operation of the transport device 20 by controlling operations of these motors based on detected information from various sensors (for example, rotary encoder, etc.). More specifically, the controller 5 causes: the travel member 41 to travel by controlling operation of the drive motor 90; the vertically movable member 43 to be vertically moved by controlling the operation of the vertical movement motor 91; a holding member 21 described below to be projected and retracted along the first direction X by controlling the operation of the projecting and retracting motor 92; and contact portions 74 of first positioning members 70 (see FIG. 5) described below to be raised and lowered by controlling the operation of the positioning motor 93.

The controller 5 includes a processor such as a microcomputer, and a peripheral circuit such as a memory. And each function of the controller 5 is performed through collaboration between such hardware and one or more computer programs executed by hardware, such as a processor. The controller 5 may be provided to the transport device 20, or may be provided separately from the transport device 20. In addition, when the controller 5 includes a plurality of pieces or parts of hardware that are separated from each other in a way that they can communicated with each other, one or more pieces or parts of hardware may be provided to the transport device 20 while the remaining pieces or parts of hardware may be provided separately from the transport device 20.

The transfer device 45 is a device configured to transfer an object 10 of paying of respects between a support portion (first support member 44*a* described below) of the transport device 20 for supporting an object 10 of paying of respects and a support portion (a pair of support arms 63 in the present example) of a transfer target (a storage section 65 or a support position 30) for supporting an object 10 of paying of respects. The transfer device 45 includes a projecting and retracting mechanism 44 configured to project and retract the holding member 21 configured to hold or support an object 10 of paying of respects along, i.e., parallel to, the first direction X. In the present embodiment, the holding member 21 is a first support member 44*a* which is a lower-end support portion for supporting from below the bottom portion 11 of an object 10 of paying of respects. And the projecting and retracting mechanism 44 projects and retracts the first support member 44*a* along the first direction X between a retracted position (position of the first support member 44*a* shown in FIGS. 1, 2, and 5) in which the first support member 44*a* is retracted (i.e., is in a retracted state) toward the vertically movable member 43 and a projected position (position of the first support member 44*a* shown in FIGS. 3 and 4) in which the first support member 44*a* is projected (i.e., is in a projected state) relative to this retracted position toward the transfer target location. The width of the first support member 44*a* along the second direction Y is less than the distance, along the second direction Y, between the support arms 63 forming a pair. The projecting and retracting mechanism 44 is configured to be capable of moving the first support member 44*a* to a projected position located on one side with respect to the retracted position along the first direction X and also to a projected position located on the opposite side with respect to the retracted position along the first direction X.

As shown in FIGS. 3 and 4, the projecting and retracting mechanism 44 is a three-stage slide-out mechanism and includes (in addition to the first support member 44*a*) a second support member 44*b* which supports the first support member 44*a* such that the first support member 44*a* can slide, or is movable smoothly, along the first direction X, and a third support member 44*c* which is fixed to the vertically movable member 43 and which supports the second support member 44*b* such that the second support member 44*b* can slide, or is movable smoothly, along the first direction X. And the projecting and retracting mechanism 44 includes an operatively connecting mechanism with which a movement of the second support member 44*b* with respect to the third support member 44*c* is linked or coupled with a movement of the first support member 44*a* with respect to the second support member 44*b* so that movement of the second support member 44*b* toward the first side X1 with respect to the third support member 44*c* causes movement of the first support member 44*a* toward the first side X1 with respect to the second support member 44*b*, and such that movement of the second support member 44*b* toward the second side X2 with respect to the third support member 44*c* causes movement of the first support member 44*a* toward the second side X2 with respect to the second support member 44*b*. In addition, the number of stages of the slide-out mechanism which forms the projecting and retracting mechanism 44 can be changed suitably.

A transfer operation of an object 10 of paying of respects from the first support member 44*a* to a storage section 65 by the transfer device 45 is described next. Firstly, the transport device 20 moves the first support member 44*a* (in a retracted position with an object 10 of paying of respects supported thereon) to an upper target position set with respect to the storage section 65, that is the transfer target, through a traveling operation of the travel member 41 and the vertical movement operation of the vertically movable member 43. Next, the transport device 20 moves the first support member 44*a* from the retracted position to the projected position by means of the projecting and retracting mechanism 44. When the storage section 65 that is the transfer target is a storage section 65 in the first storage rack 61 (i.e., is a reference storage section 65*a*), then the first support member 44*a* is moved toward the first side X1 to the projected position on the first side X1 with respect to the retracted position whereas, when the storage section 65 that is the transfer target is a storage section 65 in the second storage rack 62, then the first support member 44*a* is moved toward the second side X2 to the projected position on the second side X2 with respect to the retracted position. Subsequently, the transport device 20 lowers the first support member 44*a* to unload the object 10 of paying of respects onto the storage section 65 through vertical movement operation of the vertically movable member 43, after which, the first support member 44a is moved to the retracted position from the projected position by the projecting and retracting mechanism 44.

A detailed description of a transfer operation by the transfer device 45 of an object 10 of paying of respects from the first support member 44a to a support portion 31 is omitted here since this operation is identical to the transfer operation of the object 10 of paying of respects from the first support member 44a to a reference storage section 65a as described above, except for the fact that the upper target position in the description above is replaced by an upper target position for the support portion 31. Note that the upper target position set or defined for a support portion 31 is set to be a position higher than guide portions 33 (see FIG. 4) described below. In addition, as described below and as shown in FIG. 3, the projected position in the case of transferring an object 10 of paying of respects to a support portion 31 (first projected position L1) is set to be shifted toward the first side X1 relative to the projected position in the case of transferring an object 10 of paying of respects to a reference storage section 65a (second projected position L2). An object 10 of paying of respects is moved to a reference storage section 65a through a transfer operation of the object 10 of paying of respects to the reference storage section 65a by the transfer device 45. And an object 10 of paying of respects is moved to a support position 30 through a transfer operation of the object 10 of paying of respects to the corresponding support portion 31 by the transfer device 45. And either case of movement, the first support member 44a (the holding member 21) is moved toward the first side X1 from the retracted position to the projected position. As such, the transport device 20 includes the projecting and retracting mechanism 44 and is configured to move the holding member 21 toward the first side X1 (the partition wall 50 side along the first direction X) by means of the projecting and retracting mechanism 44 when moving an object 10 of paying of respects to a reference storage section 65a and to a support position 30.

A transfer operation of the object 10 of paying of respects from a storage section 65 to the first support member 44a by the transfer device 45 is described next. Firstly, the transport device 20 moves the first support member 44a in the retracted position to a lower target position set or defined with respect to the transfer section 65 (which is the transfer target) through a traveling operation of the travel member 41 and a vertical movement operation of the vertically movable member 43. Next, the transport device 20 moves the first support member 44a from the retracted position to the projected position by means of the projecting and retracting mechanism 44, and subsequently, raises the first support member 44a through a vertical movement operation of the vertically movable member 43 to pick up an object 10 of paying of respects from the storage section 65 with the first support member 44a, and then, causes the first support member 44a to be moved from the projected position to the retracted position by means of the projecting and retracting mechanism 44. The projected position referred to here is either the projected positon on the first side X1 or the projected position on the second side X2 with respect to the retracted position, depending on whether or not the storage section 65 that is the transfer target is a reference storage section 65a, as was the case of the transfer operation of the object 10 of paying of respects from the first support member 44a to a storage section 65 by the transfer device 45. In addition, with regard to the upper target position and the lower target position set or defined for any of the storage section 65, the lower target position is set to be at the same position along the second direction Y as the upper target position, and is set to be lower along the vertical direction Z than the upper target position by a set distance.

A detailed description of the transfer operation of the object 10 of paying of respects from a support portion 31 to the first support member 44a by the transfer device 45 is omitted here since this operation is identical to the transfer operation of the object 10 of paying of respects from a reference storage section 65a to the first support member 44a as described above, except for the fact that the lower target position referred to above is replaced by the lower target position set or defined for the support portion 31. In addition, with regard to the upper target position and the lower target position set or defined for any support portion 31, the lower target position is set to be at the same position along the second direction Y as the upper target position, and is set to be lower along the vertical direction Z than the upper target position by a set distance.

Incidentally, from a viewpoint of improving visibility of an object 10 of paying of respects or the plate-shaped member 3 in a respects-paying area 6, and from a view point of improved visual effects (designed to convey solemnness and a quality of luxury, etc.) in a respects-paying area 6, it is desirable that the distance between the object 10 of paying of respects and a person P visiting to pay respects in the respects-paying area 6 is as small as possible. An arrangement for keeping the aforementioned distance small in the storage facility 1 in accordance with the present embodiment is described next.

As described above, the transport device 20 is configured to move the first support member 44a (holding member 21) toward the first side X1 by means of the projecting and retracting mechanism 44 when moving an object 10 of paying of respects to a reference storage section 65a and to a support position 30. And, as shown in FIG. 3, the amount of projection of the first support member 44a toward the first side X1 (i.e., the amount of projection from the retracted position here and below) when moving an object 10 of paying of respects to a support position 30 is set to be greater than the amount of projection of the first support member 44a toward the first side X1 when moving an object 10 of paying of respects to a reference storage section 65a. Note that, in FIG. 3, in order to make it easier to understand the difference in the projected amount, the first support member 44a that is projected to and is in the projected position (referred to, hereinafter, as the "first projected position L1") for moving an object 10 of paying of respects to the support position 30 is shown next to the first support member 44a that is projected to and is in the projected position (referred to, hereinafter, as the "second projected position L2") for moving an object 10 of paying of respects to a reference storage section 65a.

As shown in FIG. 3, the first projected position L1 is set to be shifted toward the first side X1 by a "projecting amount difference" D relative to the second projected position L2. And the amount of projection of the first support member 44a is controlled by the controller 5 so that the first support member 44a comes to be located in the second projected position L2 when moving an object 10 of paying of respects to a reference storage section 65a whereas the amount of projection of the first support member 44a is controlled by the controller 5 so that the first support member 44a comes to be located in the first projected position L1 when moving an object 10 of paying of respects to a support position 30. In addition, the amount of projection of the first support member 44a toward the second side X2 when moving an object 10 of paying of respects to a storage section 65 that is not a reference storage section 65a is set to be the same amount as the amount of projection of the first support member 44a toward the first side X1 when moving an object 10 of paying of respects to a reference storage section 65a.

By setting the amount of projection of the first support member 44a toward the first side X1 when moving an object 10 of paying of respects to a support position 30 to be greater than the amount of projection of the first support member 44a toward the first side X1 when moving an object 10 of paying of respects to a reference storage section 65a as described above, the object 10 of paying of respects moved to the support position 30 can be brought closer to the window 52 formed in the partition wall 50 (i.e., can be brought closer to the person P visiting to pay respects who would be viewing the object 10 of paying of respects through the window 52), compared with the case where these amounts of projection are set to be identical to each other.

The support portion 31 is provided with guide portions 33 in order to move the object 10 of paying of respects that has been moved to the support position 30 by the transport device 20 further toward the first side X1 to bring it even closer to the window 52. More specifically, as shown in FIG. 4, the support portion 31 includes restriction members 32 configured to restrict movement of the object 10 of paying of respects toward the first side X1 by contacting an object 10 of paying of respects from the first side X1, and the guide portions 33 configured to move the object 10 of paying of respects toward the first side X1 to a position in which the object 10 of paying of respects contacts the restriction members 32 or a position located more toward the second side X2 relative to that position (preferably to the position in which the object 10 of paying of respects contacts the restriction members 32). And with end portions, on the second side X2, of the bottom portion 11 of an object 10 of paying of respects being end portions 11a to be contacted, each guide portion 33 has a tilted guide surface 34 which is tilted downward toward the first side X1 (i.e., tilted such that a portion thereof on the first side X1 is lower than a portion on the second side X2) and which is located in a position in which the tilted guide surface 34 would come into contact with the end portion 11a (to be contacted) of the object 10 of paying of respects transferred from the transport device 20 and placed on the support portion 31. In addition, each restriction member 32 has a vertical surface which faces toward the second side X2 and which is located in a position in which the vertical surface would come into contact with a lower portion of a side surface, on the first side X1, of an object 10 of paying of respects. Each restriction member 32 and each guide portion 33 can be formed, for example, by bending the generally-plate-shaped material or member which forms at least a part of the corresponding support arm 63.

The transport device 20 is configured to move the first support member 44a toward the first side X1 by means of the projecting and retracting mechanism 44 when placing an object 10 of paying of respects on a support portion 31. And the amount of projection of the first support member 44a toward the first side X1 when placing an object 10 of paying of respects on a support portion 31 from the transport device 20 is set such that the end portions 11a (to be contacted) of the object 10 of paying of respects would come into contact with the tilted guide surfaces 34. In other words, when the first support member 44a supporting an object 10 of paying of respects is located in the first projected position L1 above a support portion 31 as shown in FIG. 3, the end portions 11a (to be contacted) of an object 10 of paying of respects would be located at positions above the corresponding tilted guide surfaces 34 and at which the end portions 11a to be contacted overlap with the corresponding tilted guide surfaces 34 as seen along the vertical direction Z. Therefore, by lowering the first support member 44a from this state, the object 10 of paying of respects can be transferred from the transport device 20 and placed on the support portion 31 so that the end portions 11a to be contacted come into contact with the tilted guide surfaces 34.

And since the tilted guide surfaces 34 are formed to be tilted downward toward the first side X1, the end portions 11a that are on the tilted guide surfaces 34 are moved toward the first side X1 as they slide down under the gravitational force, as shown in FIG. 4. Therefore, an object 10 of paying of respects transferred from the transport device 20 and placed on the support portion 31 is allowed to move on the support portion 31 toward the first side X1 by the function of the guide portions 33 which makes use of gravity, until it reaches a position along the first direction X in which it contacts the restriction members 32. And thus, the position of the object 10 of paying of respects in a respects-paying area 6 can be shifted further toward the first side X1 (i.e., toward the window 52) by the amount of such movement.

Incidentally, in order to properly move an object 10 of paying of respects to a support position 30 set or defined close to the window 52 with the transport device 20, it is desirable to have the object 10 of paying of respects held or supported by the first support member 44a without the first support member 44a jutting out or projecting toward the first side X1 with respect to the bottom portion 11 of the object 10 of paying of respects when moving the object 10 of paying of respects to the support position 30. To this end, in the present embodiment, as shown in FIG. 4, the length, along the first direction X, of the first support member 44a is set to be less than the length, along the first direction X, of the bottom portion 11 of an object 10 of paying of respects. Therefore, when a central portion, along the first direction X, of the first support member 44a matches in position with a central portion, along the first direction X, of the bottom portion 11 of an object 10 of paying of respects, the first support member 44a does not jut out in either direction along the first direction X with respect to the bottom portion 11 of the object 10 of paying of respects. Therefore, when retrieving an object 10 of paying of respects from a storage section 65, the object 10 of paying of respects can be held and supported by the first support member 44a without the first support member 44a jutting out or projecting toward the first side X1 with respect to the bottom portion 11 of the object 10 of paying of respects without having to perform a control for matching the position of the end portion, on the first side X1, of the first support member 44a with the position of the end portion, on the first side X1, of the bottom portion 11 of the object 10 of paying of respects. As a result, it is possible to simplify the control-related arrangement for controlling the amount of projection of the first support member 44a when taking out or retrieving an object 10 of paying of respects from a storage section 65.

Further, in the present embodiment, it is made possible to accurately move an object 10 of paying of respects to a support position 30 set or defined close to the window 52 by providing the transport device 20 with a first positioning portion 70 for properly positioning an object 10 of paying of respects along horizontal directions. The first positioning portion 70 is configured to contact an object 10 of paying of respects when the object 10 of paying of respects is displaced horizontally from a first set position on the transport device 20 to correct the position of the object 10 of paying of respects to place it in the first set position. Thus, the position of an object 10 of paying of respects on the first support member 44a is corrected to a proper position which is the first set position. For example, the first set position may be set to be the position of the object 10 of paying of respects when the first support member 44a supporting the object 10 of paying of respects is located in the retracted position and when the center of the bottom portion 11 of the object 10 of paying of respects and the center of the first support member 44a match in position along of the first direction X and along the second direction Y.

Figure 5:
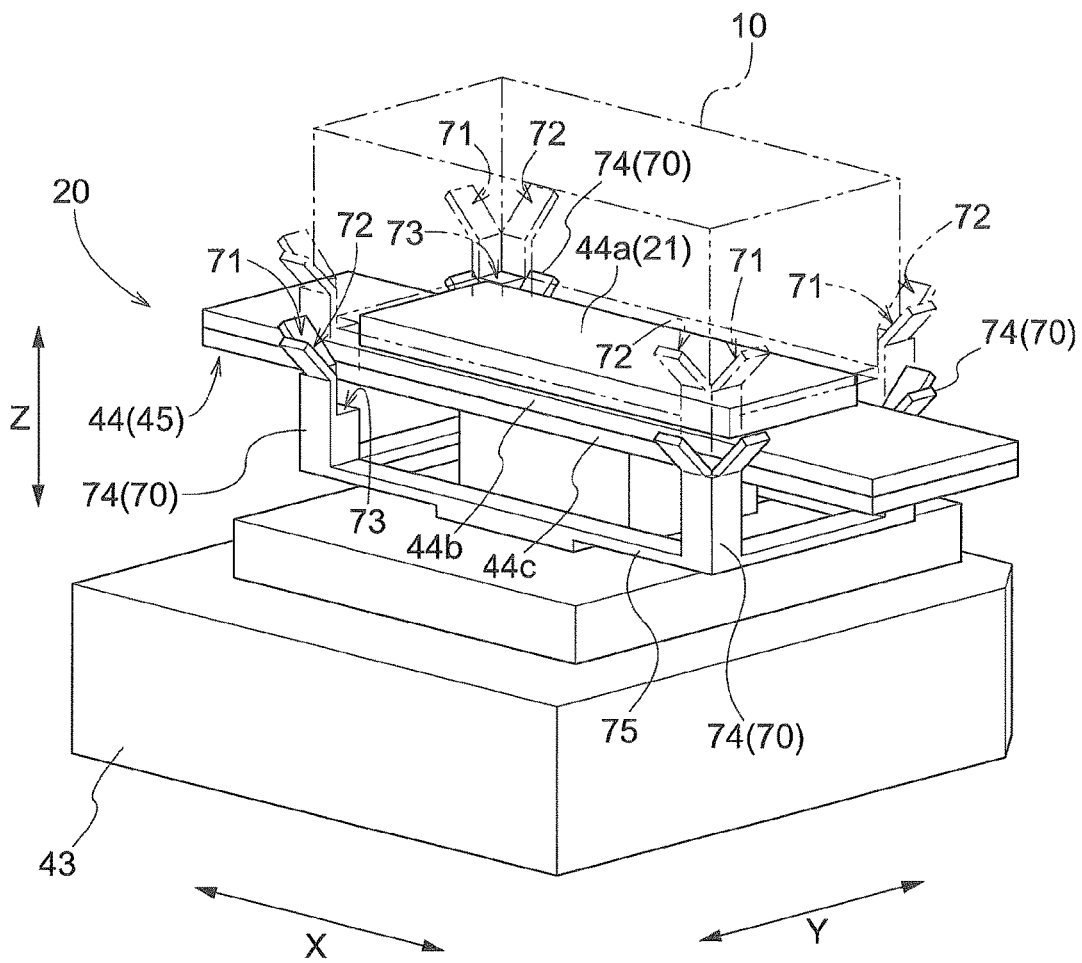
FIG. 5 is a perspective view of a part of a transport device.
Figure 6:
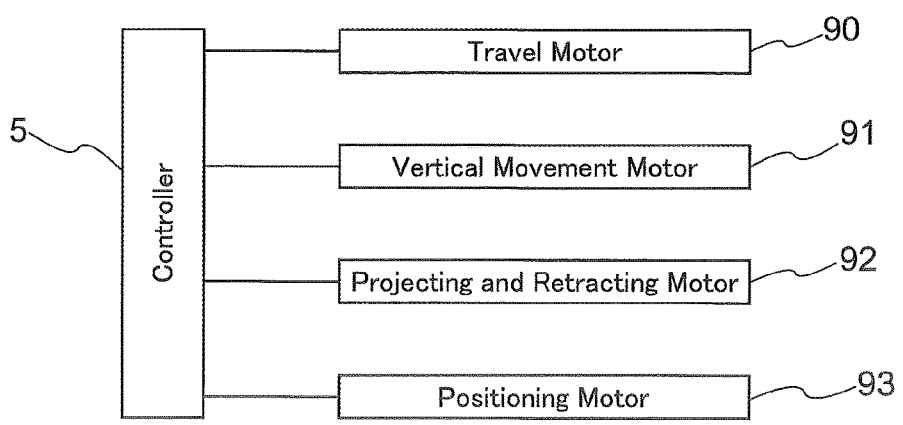
FIG. 6 is a control block diagram.

As shown in FIG. 5, the first positioning portion 70 includes first guide surfaces 71 for eliminating displacement of an object 10 of paying of respects along, i.e., parallel to, the first direction X, and second guide surfaces 72 for eliminating displacement of an object 10 of paying of respects along, i.e., parallel to, the second direction Y. Each first guide surface 71 is formed to be tilted downward toward its inward end (which is an end that is closer to a center, along the first direction X, of the first support member 44a located in the retracted position), and is provided in such a position that the first guide surface 71 comes into contact with a corresponding end portion, along the first direction X, of the bottom portion 11 of an object 10 of paying of respects when the position of the object 10 of paying of respects is displaced from the first set position along the first direction X. In addition, each second guide surface 72 is formed to be tilted downward toward its inward end (which is an end that is closer to a center, along the second direction Y, of the first support member 44a located in the retracted position), and is provided in such a position that the second guide surface 72 comes into contact with a corresponding end portion, along the second direction Y, of the bottom portion 11 of an object 10 of paying of respects when the position of the object 10 of paying of respects is displaced from the first set position along the second direction Y.

By providing the first guide surfaces 71 and the second guide surfaces 72 as described above, an object 10 of paying of respects can be moved toward the first set position along the first direction X by such first guide surfaces 71 when the object 10 of paying of respects is displaced from the first set position along the first direction X: and, an object 10 of paying of respects can be moved toward the first set position along the second direction Y by such second guide surfaces 72 when the object 10 of paying of respects is displaced from the first set position along the second direction Y. And a first guide surface 71 is provided in each of both side areas along the first direction X and a second guide surface 72 is provided in each of both side areas along the second direction Y; thus, even if the object 10 of paying of respects is displaced from the first set position along either direction on a horizontal plane, the object 10 of paying of respects can be moved toward the first set position by either, or both of, the first guide surfaces 71 and the second guide surfaces 72 to correct the position of the object 10 of paying of respects so as to place it in the first set position.

In the example shown in FIG. 5, the first positioning portion 70 includes four contact portions 74 each of which has a first guide surface 71 and a second guide surface 72 formed thereon, with each contact portion 74 located in a position that corresponds to corresponding one of the four corners of the bottom portion 11 of the object 10 of paying of respects. And by vertically moving a support portion 75 which supports these four contact portions 74 by operating the positioning motor 93 (see FIG. 6), the four contact portions 74 are vertically moved, or raised and lowered, together to a lowered position in which the guide surfaces (the first guide surfaces 71 and the second guide surfaces 72) are located at a lower position than the bottom portion 11 of the object 10 of paying of respects supported by the first support member 44a and to a raised position in which the guide surfaces (the first guide surfaces 71 and the second guide surfaces 72) are located at a higher position than the bottom portion 11 of the object 10 of paying of respects supported by the first support member 44a. Therefore, with the first support member 44a, that is supporting an object 10 of paying of respects, located in the retracted position (for example, immediately before starting to transfer an object 10 of paying of respects from the transport device 20 to a storage section 65 or to a support portion 31 by the transfer device 45), the position of the object 10 of paying of respects that is horizontally displaced from the first set position can be corrected to place it in the first set position by raising the four contact portions 74 from the lowered position to the raised position. Note that the transfer operation of the object 10 of paying of respects from the transport device 20 to a storage section 65 or to a support portion 31 by the transfer device 45 is performed after the four contact portions 74 have been lowered to the lowered position.

As shown in FIG. 5, each contact portion 74 has a support surface 73 at a location below the guide surfaces (the first guide surface 71 and the second guide surface 72) for supporting from below the bottom portion 11 of an object 10 of paying of respects. Thus, by raising the four contact portions 74 from the lowered position to the raised position, the object 10 of paying of respects placed on the first support member 44a is raised by the four contact portions 74. And by lowering the four contact portions 74 from the raised position to the lowered position, the object 10 of paying of respects, whose position has been corrected to place it in the first set position, is placed on the first support member 44a. In addition, the lower portion (portion that forms a boundary with the support surface 73) of each guide surface (the first guide surface 71 or the second guide surface 72) forms a vertical surface which restricts horizontal movement of an object 10 of paying of respects so that an object 10 of paying of respects can be held in the first set position by the vertical surfaces. Note that it is also possible to have an arrangement in which no such vertical surface is formed in any of the guide surfaces (the first guide surface 71 and the second guide surface 72) and/or in which no support surface 73 is provided to any of the contact portions 74.

[Other Embodiments]

Other embodiments of a storage facility for object of paying of respects are described next.

(1) In the embodiment described above, an example is described in which no storage section 65 is provided with a positioning portion for properly positioning an object 10 of paying of respects along horizontal directions. However, the invention is not limited to such an arrangement. As in an example shown in FIG. 7, each of the plurality of storage sections 65 may include a second positioning portion 80 configured to properly position an object 10 of paying of respects along the horizontal directions. The second positioning portion 80 is configured to contact an object 10 of paying of respects that is displaced horizontally from a second set position in the corresponding storage section 65 to correct the position of the object 10 of paying of respects to place it in the second set position. By providing such a second positioning portion 80 in each storage section 65, the position (on the first support member 44a) of the object 10 of paying of respects taken out or retrieved from a storage section 65 can be made to fall within a proper range that corresponds to the second set position. As a result, it becomes possible to accurately move an object 10 of paying of respects to a support position 30 set or defined close to the window 52.

To describe the second positioning portion 80 shown in FIG. 7, this second positioning portion 80 includes first guide surfaces 81 for eliminating displacement of an object 10 of paying of respects along or parallel to the first direction X, and second guide surfaces 82 for eliminating displacement of an object 10 of paying of respects along or parallel to the second direction Y. These first guide surfaces 81 and second guide surfaces 82 are provided to the support arms 63 which has support surfaces 83 for supporting from below the bottom portion 11 of an object 10 of paying of respects. The arrangements and the functions of the first guide surfaces 81 are identical to those of the first guide surfaces 71 of the first positioning portion 70 described above whereas the arrangements and the functions of the second guide surfaces 82 are identical to those of the second guide surfaces 72 of the first positioning portion 70 described above; thus, a detailed description of these guide surfaces 81 and 82 is omitted here. However, by providing these first guide surfaces 81 and second guide surfaces 82, the object 10 of paying of respects that is displaced from the second set position along a horizontal direction can be moved toward the second set position by either, or both of, the first guide surfaces 81 and the second guide surfaces 82 to correct the position of the object 10 of paying of respects so as to place it in the second set position, when lowering an object 10 of paying of respects to place the object 10 of paying of respects on a pair of support arms 63.

(2) In the embodiment described above, an example is described in which the first positioning portion 70 has both the first guide surfaces 71 and the second guide surfaces 72. However, the invention is not limited to such an arrangement. The first positioning portion 70 may only have either the first guide surfaces 71 or the second guide surfaces 72. Any displacement, along the first direction X, of the object 10 of paying of respects being transferred from the transport device 20 and placed on the support portion 31 can be absorbed through the function of the guide portions 33. Accordingly, the first positioning portion 70 may only have, for example, the second guide surfaces 72 for correcting the positional displacement from the first set position along the second direction Y. Similarly, in the example of FIG. 7, etc., the second positioning portion 80 may only have either the first guide surfaces 81 or the second guide surfaces 82.

(3) In the embodiment described above, an example is described in which the position of an object 10 of paying of respects is corrected to place it in the first set position by vertically moving the contact portions 74 provided to the first positioning portion 70. However, the invention is not limited to such an arrangement. The arrangement may be such that the position of an object 10 of paying of respects is corrected to place it in the first set position by vertically moving the first support member 44*a* (holding member 21) with respect to the vertically movable member 43.

(4) In the embodiment described above, an example is described in which the transport device 20 includes the first positioning portion 70. However, the invention is not limited to such an arrangement. The arrangement may be such that the transport device 20 does not include the first positioning portion 70. For example, when the support portion 31 includes a positioning portion with arrangement identical to, or similar to, the second guide surfaces 82 shown in FIG. 7 for correcting the position, along the second direction Y, of an object 10 of paying of respects to place it in a proper position, then the arrangement may be such that the transport device 20 does not include the first positioning portion 70.

(5) In the embodiment described above, an example is described in which the length of the first support member 44*a* along the first direction X is less than the length of the bottom portion 11 of an object 10 of paying of respects along the first direction X. However, the invention is not limited to such an arrangement. the length of the first support member 44*a* along the first direction X may be the same as, or greater than, the length of the bottom portion 11 of an object 10 of paying of respects along the first direction X.

(6) In the embodiment described above, an example is described in which the holding member 21 for holding or supporting an object 10 of paying of respects is a lower-end support portion (the first support member 44*a*) which supports from below the bottom portion of an object 10 of paying of respects. However, the invention is not limited to such an arrangement. For example, the holding member 21 may include a pair of clamp portions which can hold an object 10 of paying of respects from the both sides along the second direction Y. Alternatively, the holding member 21 may include a grip portion which grips a projection (flange portion etc.) provided in an upper portion of each object 10 of paying of respects. In addition, when the holding member 21 is not a lower-end support portion as in the examples above, the arrangement may be such that the entire bottom portion 11 of an object 10 of paying of respects is supported from below in each storage section 65 and/or in a support position 30.

(7) In the embodiment described above, an example is described in which the plurality of storage sections 65 provided to the storage facility 1 includes a plurality of reference storage sections 65*a*. However, the invention is not limited to such an arrangement. The arrangement may be such that the plurality of storage sections 65 provided to the storage facility 1 includes only a single reference storage section 65*a*. In the embodiment described above, an example is described in which the plurality of storage sections 65 provided to the storage facility 1 includes both reference storage sections 65*a* and non-reference storage sections (storage sections 65 that are not reference storage sections 65*a*). However, the invention is not limited to such an arrangement. the arrangement may be such that all of the plurality of storage sections 65 provided to the storage facility 1 are reference storage sections 65*a*, for example, which can be achieved by providing the storage facility with no second storage rack 62.

(8) In the embodiment described above, an example is described in which the partition wall 50 is a member provided in addition to a wall 7. However, the invention is not limited to such an arrangement. The partition wall 50 may be formed integrally with a wall 7. That is, a portion of a wall 7 that is located in a respects-paying area 6 may form, or function as, a partition wall 50.

(9) In the embodiment described above, an example is described in which the transport device 20 is a stacker crane. However, the invention is not limited to such an arrangement. The transport device 20 may be a transport device other than a stacker crane, such as, among other possibilities, a ceiling or overhead transport vehicle capable of traveling along a travel rail (travel path) provided on a ceiling side to transport an article, or an article transport vehicle capable of traveling on a floor surface autonomously while recognizing or detecting its own current position.

(10) In the embodiment described above, an example is described in which an object 10 of paying of respects is a container (a container for religious purposes) which has a general outer shape of a rectangular parallelepiped. However, the invention is not limited to such an arrangement. Each object 10 of paying of respects may be a container which is for holding, or configured to hold, one or more housed objects 2 such as cremated remains or a funerary urn but which does not have a general outer shape of a rectangular parallelepiped. For example, an object 10 of paying of respects may be a container which is shaped to resemble a building for religious purposes, such as a temple, shrine ,or cathedral, or may be a container which has an outer shape of an object of worship or prayer, such as, Christ, Buddha, a bodhisattva (e.g., Kshitigarbha, a guardian deity of children, etc.) or a religious saint or personage. In addition, a thing or material that is placed over a "housed object 2" from above (a thing or material that covers an object or material 2 from above and sides) is also considered to fall within the meaning of a container as used in the present specification. In addition, an object 10 of paying of respects does not have to be and may not be a container. For example, an object 10 of paying of respects may be a mortuary tablet, or a statue of Buddha, Christ or Mary, etc., as described above. Therefore, an object 10 of paying of respects may be an object (such as cremated remains or a funerary urn containing cremated remains, etc.) representing one (such as the deceased, etc.) being paid respects to, or may be a container for containing, or configured to contain, such object.

(11) In the embodiment described above, an example is described in which the guide portions 33 are provided to the support portion 31. However, the invention is not limited to such an arrangement. The arrangement may be such that no guide portions 33 are provided to the support portion 31.

(12) In the embodiment described above, an example is described in which each support portion 31 is provided in the corresponding support position 30. However, the invention is not limited to such an arrangement. The arrangement may be such that no support portion is provided at the support position 30 and instead may be such that, the object 10 of paying of respects remains being held in the support position 30 by the holding member 21 (i.e., being supported by the first support member 44a) after the object 10 of paying of respects is moved to the support position 30 by the holding member 21 and until the person P visiting to pay respects has finished paying respects.

(13) Note that an arrangement disclosed in any of the embodiments described above can also be used in combination with any arrangement disclosed in any other embodiment unless inconsistency arises. This applies to any combination of embodiments which are described as "other embodiments". Regarding any other arrangements and features, the embodiments disclosed in the present description are provided for the purposes of illustration only regarding all aspects. Therefore, it is possible to make various suitable changes without departing from the spirit of the present disclosure.

[Summary of Embodiments Described Above]

A brief summary of the storage facility for object of paying of respects described above is provided next.

A storage facility for objects of paying of respects comprises: a plurality of storage sections each configured to store an object of paying of respects; a respects-paying area which includes an area for a person, visiting to pay respects, to pay respects; and a transport device configured to transport an object of paying of respects between any of the plurality of storage sections and a support position provided in the respects-paying area, wherein a partition wall extending vertically is provided in the respects-paying area, wherein the partition wall is so located to partition off the support position from the person visiting to pay respects, at a partition position along a first direction parallel to a horizontal plane, wherein a window for allowing the person visiting to pay respects to view an object of paying of respects is formed in an area, of the partition wall, toward which the object of paying of respects faces along the first direction when supported in the support position, wherein the plurality of storage sections include one or more reference storage sections each of which is defined to be a storage section that has an occupiable area at least a portion of which extends over a same positional range along the first direction as a portion of an occupiable area in the support position, wherein the transport device includes a projecting and retracting mechanism configured to project and retract along the first direction a holding member configured to hold an object of paying of respects, wherein the transport device is configured to move the holding member toward a partition wall side along the first direction when moving an object of paying of respects to a reference storage section or to the support position by means of the projecting and retracting mechanism, and wherein an amount of projection of the holding member toward the partition wall side when moving an object of paying of respects to the support position is set to be greater than an amount of projection of the holding member toward the partition wall side when moving an object of paying of respects to a reference storage section.

With the arrangement described above, an object of paying of respects can be moved to a support position by making use of the projecting and retracting mechanism provided in a transport device to transfer an object of paying of respects between the transport device and a storage section. Thus, the structure of the transport device can be made simpler compared with the case in which a mechanism for moving an object of paying of respects to a support position is provided to the transport device in addition to a projecting and retracting mechanism.

In addition, with the arrangement described above, regarding the amount of projecting and retracting movement of the holding member (provided to the transport device for holding an object of paying of respects) by the projecting and retracting mechanism, the amount of projection of the holding member toward the partition wall side when moving an object of paying of respects to the support position is set to be greater than an amount of projection of the holding member toward the partition wall side when moving an object of paying of respects to a reference storage section. Therefore, the support position can be brought, or set to be, closer to the window (i.e., can be brought, or set to be, closer to the person visiting to pay respects who would be viewing the object of paying of respects through the window) compared with the case where these amounts of projection are set to be identical to each other.

In addition, with the arrangement described above, the support position is located or set such that at least a portion of an occupiable area (of each of one or more reference storage sections) extends over a same positional range along the first direction as a portion of an occupiable area in the support position. Thus, there is an additional advantage that the dimension, along the first direction, of the entire facility of can be made smaller than otherwise.

Therefore, with the arrangement described above, a storage facility for objects of paying of respects can be provided in which the transport device configured to transport an object of paying of respects between a storage section and a support position has a relatively simple structure while shortening a distance between the support position and a person visiting to pay respects.

Here, the holding member is preferably a lower-end support portion which supports from below a bottom portion of an object of paying of respects, and wherein a length, along the first direction, of the lower-end support portion is preferably less than a length, along the first direction, of the bottom portion of the object of paying of respects.

With the first side being defined to be the side along the first direction on which the window is located with respect to the support position, in order to properly move an object of paying of respects to the support position set close to the window, it is desirable for the object of paying of respects to be held or supported by the lower-end support portion without the lower-end support portion projecting or jutting out toward the first side from the bottom portion of the object of paying of respects when moving the object of paying of respects to the support position. Regarding this point, with the arrangement described above, since the length, along the first direction, of the lower-end support portion is less than the length, along the first direction, of the bottom portion of an object of paying of respects, the object of paying of respects can be held, or supported, by the lower-end support portion without the lower-end support portion projecting or jutting out toward the first side from the bottom portion of the object of paying of respects by setting the amount of projection of the lower-end support portion toward the storage section (referred to simply as "amount of projection" in this paragraph) when retrieving an object of paying of respects from a storage section such that a central portion, along the first direction, of the lower-end support portion matches in position with a central portion, along the first direction, of the bottom portion of an object of paying of respects. That is, unlike the case where the length, along the first direction, of the lower-end support portion is greater than the length, along the first direction, of the bottom portion of an object of paying of respects, the object of paying of respects can be held, or supported, by the lower-end support portion without the lower-end support portion projecting or jutting out toward the first side from the bottom portion of the object of paying of respects without having to adjust the respective amounts of projection to match the position of the end portion, on the first side, of the lower-end support portion with the end portion, on the first side, of the bottom portion of the object of paying of respects. As a result, it is possible to simplify the control-related arrangement for the amount of projection for holding or supporting the object of paying of respects such that the lower-end support portion would not jut out from the bottom portion of the object of paying of respects.

In addition, the transport device preferably includes a first positioning portion configured to properly position an object of paying of respects along a horizontal direction, wherein the first positioning portion is preferably configured to contact the object of paying of respects when the object of paying of respects is displaced, along the horizontal direction, from a first set position on the transport device to correct a position of the object of paying of respects to place the object of paying of respect in the first set position.

With the arrangement described above, even if the position of an object of paying of respects on the transport device is displaced from the first set position along the horizontal direction, the position of the object of paying of respects can be corrected by the first positioning portion to place it in the first set position before moving the object of paying of respects to the support position. Therefore, the object of paying of respects can be accurately moved to a support position set or defined close to the window.

In addition, each of the plurality of storage sections preferably includes a second positioning portion configured to properly position an object of paying of respects along a horizontal direction, and wherein the second positioning portion is preferably configured to contact an object of paying of respects when the object of paying of respects is displaced, along the horizontal direction, from a second set position in the corresponding storage section to correct a position of the object of paying of respects to place the object of paying of respect in the second set position.

With the arrangement described above, since an object of paying of respects is stored with the object of paying of respects properly positioned in the second set position in each storage section, it is possible to have the position, on the transport device, of the object of paying of respects taken out or retrieved from the storage section within an area on the transport device that corresponds to the second set position. As a result, the object of paying of respects can be accurately moved to a support position set or defined close to the window.

It is considered to be sufficient for the storage facility for object(s) of paying of respects in accordance with the disclosure to perform at least one of the results or effects described above.

What is claimed is:

1. A storage facility for objects of paying of respects comprising:
    a plurality of storage sections each configured to store an object of paying of respects;
    a respects-paying area which includes an area for a person, visiting to pay respects, to pay respects; and
    a transport device configured to transport an object of paying of respects between any of the plurality of storage sections and a support position provided in the respects-paying area;
    wherein a partition wall extending vertically is provided in the respects-paying area,
    wherein the partition wall is so located to partition off the support position from the person visiting to pay respects, at a partition position along a first direction parallel to a horizontal plane,
    wherein a window for allowing the person visiting to pay respects to view an object of paying of respects is formed in an area, of the partition wall, toward which the object of paying of respects faces along the first direction when supported in the support position,
    wherein the plurality of storage sections include one or more reference storage sections each of which is defined to be a storage section that has an occupiable area at least a portion of which extends over a same positional range along the first direction as a portion of an occupiable area in the support position,
    wherein the occupiable area of the support position is nearer to the partition wall than the occupiable area of each of the reference storage section is to the partition wall along the first direction,
    wherein the transport device includes a projecting and retracting mechanism configured to project and retract along the first direction a holding member configured to hold an object of paying of respects, wherein the transport device is configured to move the holding member toward a partition wall side along the first direction when moving an object of paying of respects to a reference storage section or to the support position by means of the projecting and retracting mechanism,
    wherein an amount of projection of the holding member toward the partition wall side when moving an object of paying of respects to the support position is set to be greater than an amount of projection of the holding member toward the partition wall side when moving an object of paying of respects to a reference storage section; wherein the plurality of storage sections are arranged in a plurality of horizontal rows with one horizontal row located above another horizontal row along a vertical direction and in a plurality of vertical rows with one vertical row located next to another vertical row along a second direction which is a direction perpendicular to the first direction in a horizontal plane, and which the support position is provided in place of one of the plurality of storage sections.

2. The storage facility for objects of paying of respects as defined in claim 1, wherein the holding member is a lower-end support portion which supports from below a bottom portion of an object of paying of respects, and wherein a length, along the first direction, of the lower-end support portion is less than a length, along the first direction, of the bottom portion of the object of paying of respects.

3. The storage facility for objects of paying of respects as defined in claim 1, wherein the transport device includes a first positioning portion configured to properly position an object of paying of respects along a horizontal direction, wherein the first positioning portion is configured to contact the object of paying of respects when the object of paying of respects is displaced, along the horizontal direction, from a first set position on the transport device to correct a position of the object of paying of respects to place the object of paying of respect in the first set position.

4. The storage facility for objects of paying of respects as defined in claim 1, wherein each of the plurality of storage sections includes a second positioning portion configured to properly position an object of paying of respects along a horizontal direction, and wherein the second positioning portion is configured to contact an object of paying of respects when the object of paying of respects is displaced, along the horizontal direction, from a second set position in the corresponding storage section to correct a position of the object of paying of respects to place the object of paying of respect in the second set position.

5. The storage facility for objects of paying of respects as defined in claim 1, wherein a side in the first direction on which the window is located with respect to the support position is defined as a first side, and a side opposite to the first side is defined as a second side, and wherein an object of paying of respects supported in the support position, excluding an end portion thereof on the first side, and an object of paying of respects stored in the reference storage section, excluding an end portion thereof on the second side, are located in the same positional range along the first direction.

* * * * *

UNITED STATES PATENT AND TRADEMARK OFFICE
CERTIFICATE OF CORRECTION

| | |
|---|---|
| PATENT NO. | : 10,294,690 B2 |
| APPLICATION NO. | : 15/926059 |
| DATED | : May 21, 2019 |
| INVENTOR(S) | : Hidenobu Shinnaka et al. |

It is certified that error appears in the above-identified patent and that said Letters Patent is hereby corrected as shown below:

In the Claims

Column 20, Line 31, Claim 1, delete "to pay respects, to pay respects; and" and insert -- to pay respects; --

Column 20, Line 55, Claim 1, delete "section" and insert -- sections --

Column 21, Line 12, Claim 1, delete "which" and insert -- wherein --

Signed and Sealed this
Sixth Day of August, 2019

Andrei Iancu
*Director of the United States Patent and Trademark Office*